United States Patent
Yuen et al.

(10) Patent No.: US 7,636,550 B2
(45) Date of Patent: Dec. 22, 2009

(54) SYSTEM AND METHOD FOR DETERMINING CHANNEL QUALITY IN A WIRELESS NETWORK

(75) Inventors: Michael Yuen, Waltham, MA (US); David Hill, Holden, MA (US); Roger Durand, Amherst, NH (US)

(73) Assignee: Autocell Laboratories, Inc., Acton, MA (US)

( * ) Notice: Subject to any disclaimer, the term of this patent is extended or adjusted under 35 U.S.C. 154(b) by 701 days.

(21) Appl. No.: 11/165,007

(22) Filed: Jun. 23, 2005

(65) Prior Publication Data

US 2006/0292988 A1  Dec. 28, 2006

(51) Int. Cl.
- H04B 15/00 (2006.01)
- H04W 72/00 (2009.01)
- H04B 7/00 (2006.01)
- H04W 4/00 (2009.01)

(52) U.S. Cl. .................... 455/62; 455/450; 455/507; 370/329

(58) Field of Classification Search ............... 455/442, 455/522, 512, 67.11, 69, 453, 127.1, 62, 455/101, 63.1, 562.1, 509, 552, 507, 450; 370/328, 229, 329, 332, 335, 390, 401, 252
See application file for complete search history.

(56) References Cited

U.S. PATENT DOCUMENTS

| | | | |
|---|---|---|---|
| 5,886,988 A * | 3/1999 | Yun et al. | 370/329 |
| 6,052,596 A * | 4/2000 | Barnickel | 455/450 |
| 6,795,407 B2 | 9/2004 | Chesson | |
| 6,870,815 B2 | 3/2005 | McFarland et al. | |
| 2004/0219920 A1 * | 11/2004 | Love et al. | 455/442 |
| 2005/0074030 A1 * | 4/2005 | Cho et al. | 370/474 |
| 2005/0152480 A1 * | 7/2005 | Chang et al. | 375/343 |
| 2005/0250511 A1 * | 11/2005 | Xiao et al. | 455/453 |

* cited by examiner

*Primary Examiner*—Melody Mehrpour
(74) *Attorney, Agent, or Firm*—Anderson Gorecki & Manaras LLP (57) ABSTRACT

A system and method for Access Point (AP) channel selection based upon a Channel Quality Index (CQI) is described. The Channel Quality Index (CQI) is a value which quantifies a transmission quality of a channel. The transmission quality is evaluated based on a combination of different types of measured interference in the channel. In one embodiment the different types of measured interference include co-channel congestion, adjacent channel interference and in-band interference. The CQI is a value derived from the measurements, and for example may be a sum of all of the measurements. Each AP of the present invention determines the CQI of potential transmission channels, and selects a channel for use which has the 'best' CQI; for example if the CQI is a sum of all measured interferences, the 'best' AP is the one with the lowest CQI

12 Claims, 6 Drawing Sheets

SYSTEM AND METHOD FOR DETERMINING CHANNEL QUALITY IN A WIRELESS NETWORK

FIELD OF THE INVENTION

This invention is generally related to wireless communications, and more particularly to a method and apparatus for quantifying transmission channel quality in a wireless network.

BACKGROUND OF THE INVENTION

As it is known in the art, a Wireless Local Area Network (WLAN) is a local-area network that uses high-frequency radio waves, rather than wires, to communicate between nodes. Various types of wireless LAN networks exist, and an example of a wireless data network is described in "IEEE Standard for Information technology—Telecommunications and information exchange between systems—Local and metropolitan area networks—Specific requirements—Part 11: Wireless LAN Medium Access Control (MAC) and Physical Layer (PHY) specifications, incorporated herein by reference (hereinafter "802.11").

Each wireless network typically includes an Access Point device (AP) to allow one or more stations (STAs) to connect to a wired LAN. Access points transmit to the stations by selecting a frequency, or channel, in an available frequency spectrum for communication. 802.11(a) compliant devices operate in the 5 GHz frequency band using OFDM, with data rates up to 54 Mbps. 802.11(b) compliant devices operate in the 2.4 GHz frequency band using direct sequence spread spectrum, with data rates up to 11 Mbps. 802.11(b) devices currently represent the majority of installed wireless LANs. 802.11(g) compliant devices operate in the 2.4 GHz frequency band using OFDM, with data rates up to 54 Mbps.

Each AP device in a wireless network selects one channel within a defined frequency band of operation. However there may be interference in the frequency band generated by competing devices or resulting from physical or environmental characteristics at various points in the wireless network. It is desirable for an access point to efficiently identify the most desirable transmission channel.

SUMMARY OF THE INVENTION

A channel selection method of the present invention includes the steps of calculating a channel quality index (CQI) for a each one of a plurality of channels available for communication use by an access point in a wireless network, and the access point selecting a channel for operation according to relative channel quality indices of the plurality of channels. In one embodiment, the CQI quantifies a quality of a channel, the quality being measured by a combination of co-channel congestion, adjacent channel interference and in-band interference measured by the access point at each of the plurality of channels. The CQI is stored for each of the plurality of channels, and periodically updated, thereby enabling the access point to quickly identify a preferable communication channel.

According to another aspect of the invention, an access point device includes a table, storing, for each one of a plurality of channels available for communication by the access point, a channel quality index, the channel quality index quantifying a quality of an associated channel relative to at least two different types of noise characteristics in the channel.

According to a further aspect of the invention, a computer program product stored in a computer readable device, the computer program logic includes program code for calculating a channel quality index for each of a plurality of channels available for communication by an access point, the program code including program code for measuring a co-channel congestion, predicting an adjacent channel interference and quantizing a weighted in-band interference for each of the plurality of channels, and for summing the co-channel congestion, predicted adjacent channel interference and quantized weighted in-band interference to provide a channel quality index. The computer program product also includes program code for selecting one of the plurality of channels as a preferred channel for transmission responsive to the channel quality indices of the plurality of channels.

DETAILED DESCRIPTION

In accordance with the present invention, a system and method for Access Point (AP) channel selection based upon a Channel Quality Index (CQI) will now be shown and described. The Channel Quality Index (CQI) of the present invention is a value which quantifies a transmission quality of a channel. The transmission quality is evaluated based on a combination of different types of measured interference in the channel. In one embodiment the different types of measured interference include co-channel congestion, adjacent channel interference and in-band interference, although the present invention is not limited to any specific combination of interference considerations. The CQI is a value derived from the measurements, and for example may be a sum of all of the measurements. Each AP of the present invention determines the CQI of potential transmission channels, and selects a channel for use which has the 'best' CQI; for example if the CQI is a sum of all measured interferences, the 'best' AP is the one with the lowest CQI.

Figure 1:
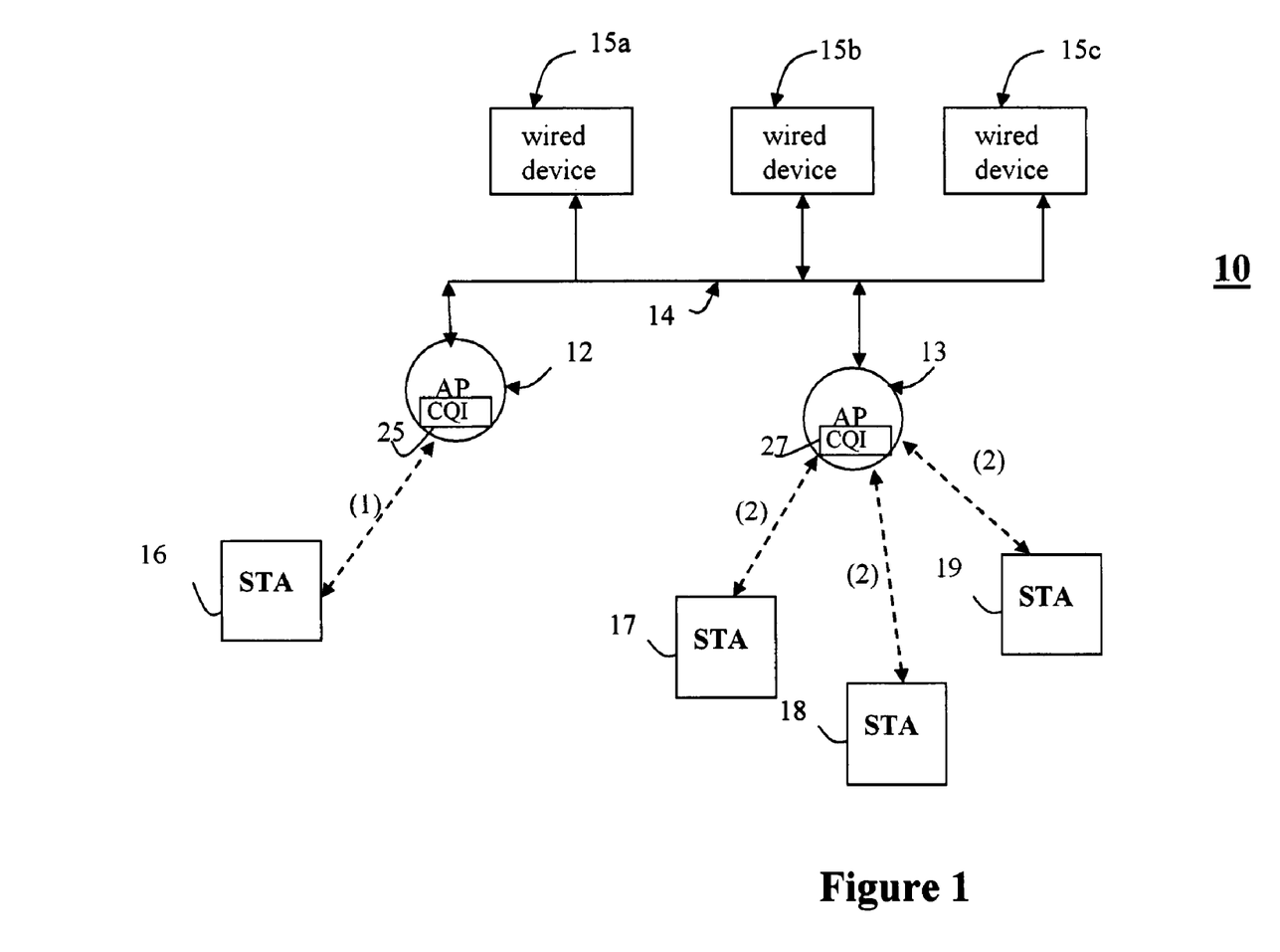
FIG. 1 is a block diagram of a local wireless network in which a channel selection method of the present invention may be used.

Referring now to FIG. 1, a typical wireless communications environment 10 includes access point (AP) devices 12 and 13 that interface between a wired communications medium 14 and wireless devices 16-19 to provide network access to the wireless devices. Wireless device 16 can thus communicate with wired devices 15a-15c and other wireless devices 16-19 via the access device 12. Similarly, wireless devices 17, 18 and 19 can communicate with wired devices 15a-15c, wireless device 16 and with each other via access device 13. These access devices 12 and 13 are referred to by various names depending upon the wireless architecture employed, and are herein referred to as "access points" or "APs". The wireless devices 16-19 also have various architecture dependent names and are herein referred to as "stations" or STAs. A wireless communications capable device may be an AP, or a STA, or both.

In a wireless network such as network 10, each AP communicates with the stations over transmission channels, wherein channel numbers are shown in brackets in FIG. 1. and indicate a designated radio frequency available for use by the transmitter and receiver of two communicating devices. Thus AP 12 communicates with STA 16 via channel (1), and AP 13 communicates with stations 17, 18 and 19 over channel (2). Each AP typically selects a preferred channel for communication at initialization. In addition, as described in pending application Ser. No. 11/103,403, entitled Backup Channel Selection in WLANs, filed on Apr. 11, 2005 by Yuen et al, and incorporated herein by reference, an AP may also periodically monitor unused channels for evaluation purposes. In the event that the AP identifies that an alternate channel has preferred communication characteristics over a currently used channel, the AP may transition communications to the preferred alternate channel. The Channel Quality Index of the present invention may be a value that is stored by the APs to expedite and improve the quality of channel selection decisions. FIG. 1 illustrates that each AP 12 and 13 of the present invention includes a respective CQI table 25, 27.

Figure 2:
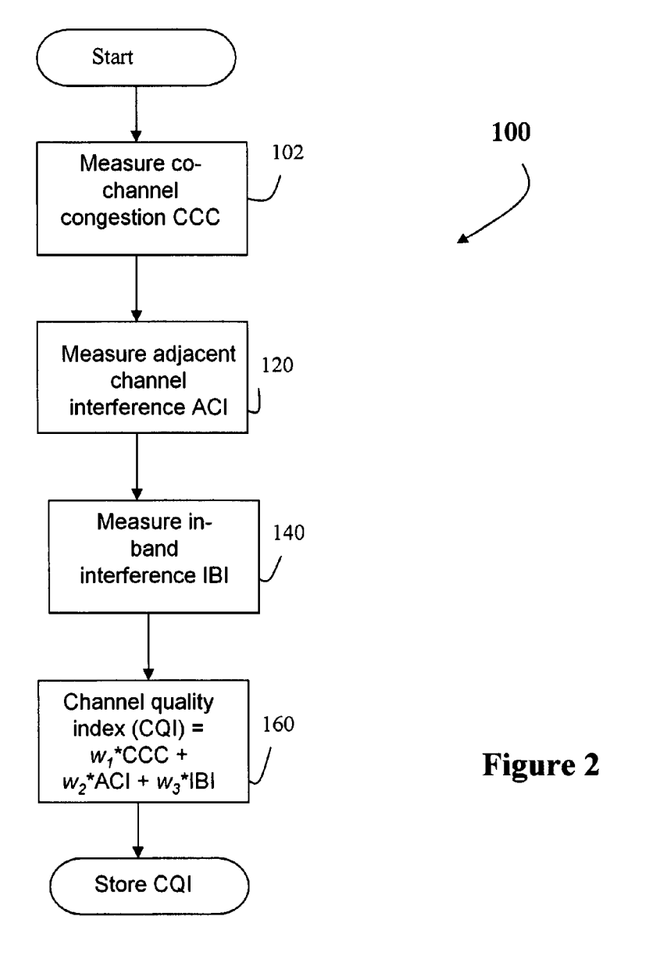
FIG. 2 is a flow diagram provided to illustrate several steps that may be performed in the generation of a channel quality index of the present invention.

FIG. 2 is a flow diagram illustrating several exemplary steps that may be taken to measure different interferences, which measurements may then be used to calculate a CQI for a given channel. Although the steps are shown and will be described in a certain sequence, it should be understood that they may be performed simultaneously or in any order. In addition, each measurement may be updated at different rates, and thus the present invention is not to be limited by the sequence in which the measurements are ascertained, or to any particular order by which the steps are described below.

1. Co-channel Congestion

The co-channel congestion (CCC) is congestion resulting from the simultaneous transmission of APs of a compatible transceiver type in the same channel. The co-channel congestion (CCC) measurement 102 is made in terms of measured noise power in the wireless medium or Ether based channel; in this embodiment CCC will be measured in decibels per milliwatt (dBms). If the channel is empty, the co-channel congestion value is the platform noise floor value for the channel. Platform Noise Floor is a configuration parameter for each radio. For example, a good WLAN reference might be −95 dBm. If the channel is not empty, and there is more than one AP, in one embodiment the AP with the highest power on the channel is used for the measurement. Thus the Co-channel congestion (CCC) value is determined according to Equation I below.

Co-channel congestion=MAX(Platform Noise Floor Value, Loudest AP on the channel)   Equation I:

where the MAX function selects the largest of either the Platform Noise or the Loudest AP.

As shown at step 160 of FIG. 2, in one embodiment, a user selected weight value $w_1$ may be selectively applied to the co-channel congestion predication value to increase or decrease the impact of co-channel congestion when determining the overall channel quality index (CQI).

The above embodiment for determining a co-channel congestion value effectively measures the loudest AP on the channel. This method advantageously quantifies co-channel congestion in an expedient and straightforward manner. In an alternative embodiment of this invention, information regarding the density of each channel (i.e. the number of APs on the channel) is considered when calculating the co-channel congestion. One advantage of including channel density effects when calculating the CCC is that more accurately represents the activity in the channel and thus improve the quality of the CQI calculation. For example, when looking only at the loudest AP on a channel using Equation I above, a channel with one AP of −40 dBm would have the same CCC value as a channel in which 3 APs are being received at signal powers of −40 dBm, −47, and −54.

Figure 3:
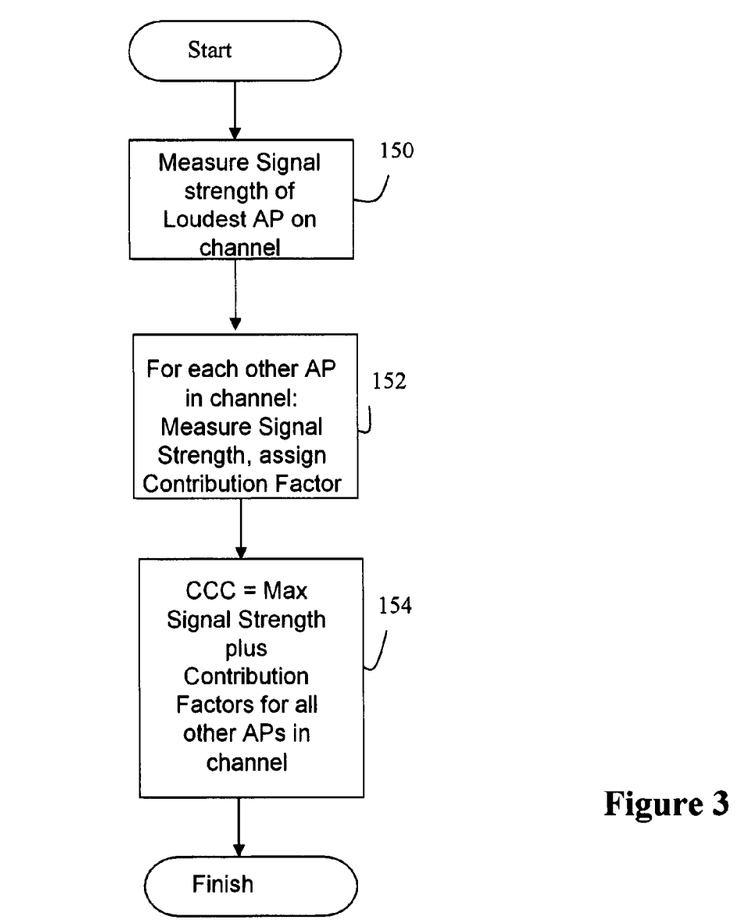
FIG. 3 is a flow diagram provided to illustrate several exemplary steps that may be performed in one embodiment of a co-channel congestion determination process.

An improved CCC value can be obtained by incorporating information regarding the density of APs in the channel. Exemplary steps that may be taken in the alternate process of calculating CCC are shown in FIG. 3. At step 150, the noise value for the loudest AP on the channel is measured as described in Equation I. At step 152, the contributions of other APs occupying the same channel are determined by measuring the signal strength of each of the APs, converting the signal strength into a Contribution Factor (f) for the AP, and adding a Contribution Factor (f) to the CCC obtained at step 150. The Contribution Factor (f) is a value associated with a range of signals strengths. The particular Contribution Factor (f) associated with a signal strength range is a matter of design choice, but is generally selected to increase or decrease in accordance with the signal strength of the associated AP. The maximum contribution factor is selected according to a desired maximum density of a channel, and should be high enough to reflect the existence of another AP, but low enough so that use of the channel would still be encouraged for lower AP densities. In addition, the values are selected so that the contribution factor decreases along with the signal strength, so that less weight is given to APs that are a farther distance from the loudest AP in the channel. It is noted that although a linear relationship between the signal power levels and the congestion factor is shown in the tables, non-linear relationships which more heavily penalize closer APs are also envisioned, and it should be noted that congestion factors shown are exemplary only. Table I below illustrates exemplary Contribution Factors for A band communications, and table II below illustrates exemplary Contribution Factors for B/G band communications:

TABLE I

| Received Power | dBs to add |
|---|---|
| > −45 dBm | 6 |
| −46 dBm to −51 dBm | 5 |
| −52 dBm to −57 dBm | 4 |
| −58 dBm to −63 dBm | 3 |
| −64 dBm to −69 dBm | 2 |
| −70 dBm or less | 1 |

TABLE II

| Received Power | dBs to add |
|---|---|
| > −38 dBm | 6 |
| −39 dBm to −44 dBm | 5 |
| −45 dBm to −50 dBm | 4 |
| −51 dBm to −56 dBm | 3 |
| −57 dBm to −62 dBm | 2 |
| −63 dBm or less | 1 |

Once the Contribution Factors (f) for each other AP in the channel is calculated, at step 154 the co-channel congestion can be calculated by adding the Signal Strength (in dBs) of the loudest AP in the channel with the Contribution Factors of each of the other APs in the channel. Thus, returning again to the above example comparing a channel with one AP at −40 dBm to a channel with three APs ,having respective signal strengths of −40 dBm, −47 dBm and −54 dBm, the co-channel congestion for this channel would be (assuming we are using the B/G band) is:

Co-channel congestion=−40 dBm+$f$(−47 dBm)+$f$(−54 dBm)

Co-channel congestion=−40 dBm+4 dB+3 dB=−33 dBm

The resulting calculation thus indicates that the channel with three APs is of lower quality than the channel with one AP, by a 7 dBs margin, even though both channels have the same in-band noise level.

The co-channel congestion measurement may be further adapted in response to other network considerations. For example, if it is desirable to avoid other WLANs, signal levels of all APs heard in the channel are taken into consideration. However, if it is not necessary to avoid other WLAN, it may be desirable to consider only the APs with SSIDs indicating that they are in the network under evaluation. Other methods for selecting APs to consider, for example based on ranges or signal strengths, may also be used, and the present invention is not limited merely by the specific embodiment or example provided above.

2. Adjacent Channel Interference:

Adjacent Channel Interference (ACI) is interference caused by extraneous power from a signal in an adjacent channel. Adjacent channel interference is caused by imperfect filtering, such as incomplete filtering of unwanted modulation products in frequency modulation (FM) systems, improper tuning, and/or poor frequency control in the transmitting reference channel along with the receiving radio characteristics for the interfering channel.

Figure 4A:
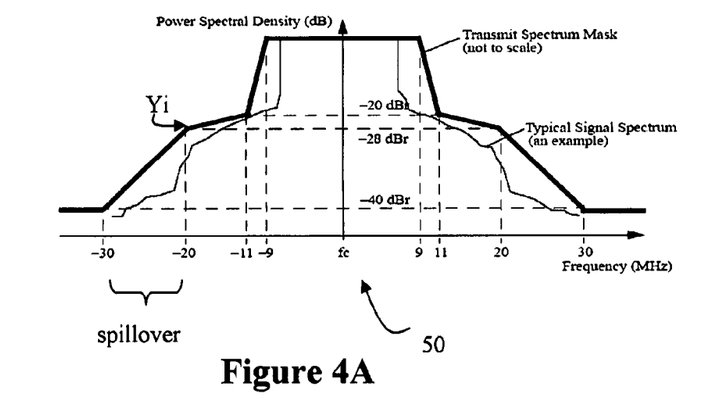
FIGS. 4A and 4B are provided to illustrate the 802.11a Transmit Spectrum Mask and the spill over of the 802.11a Transmit Spectrum Mask of adjacent channels.
Figure 4B:
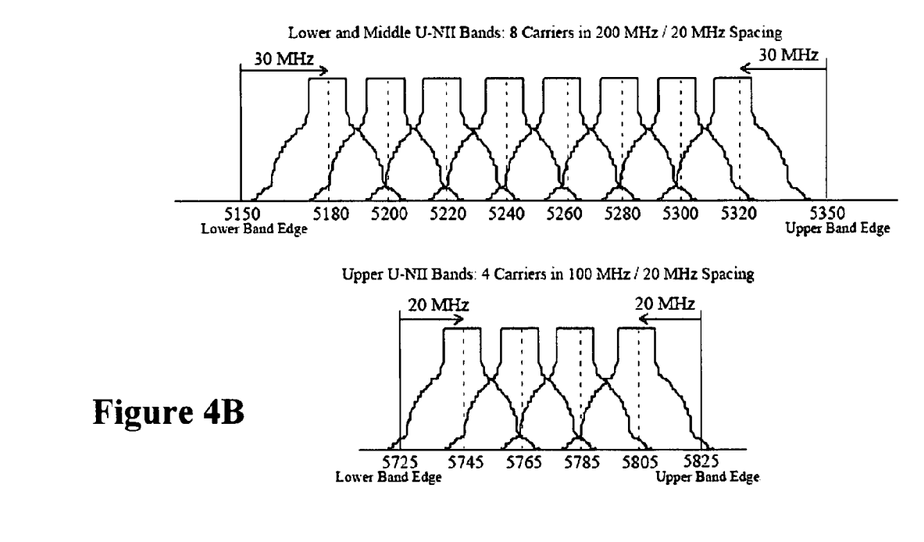

ACI includes a predictable amount of adjacent channel interference which may be added to the quietness of the channel obtained from the CCC measurement. Signals generated by commercially available wireless equipment tend to generate some amount of energy outside of their approved spectrum band. This is called side band emissions. This also is true of other wireless devices, such as Bluetooth, cordless telephones and devices. Although filtering is usually done to minimize RF interference from adjacent channels, some of the energy spills into the adjacent channel and causes interference with products operating on the adjacent channel. If the ACI is much stronger than the 802.11 signal, side band energy from the ACI can dominate the channel's noise floor. For example, FIG. 4A illustrates the 802.11a transmit spectrum mask. In order to more fully populate the frequency spectrum with channels, the channels are typically closely spaced within the spectrum. Such spacing, however, results in a certain amount of spillover of side lobe energy between channels, as shown in FIG. 4B.

Figure 5:
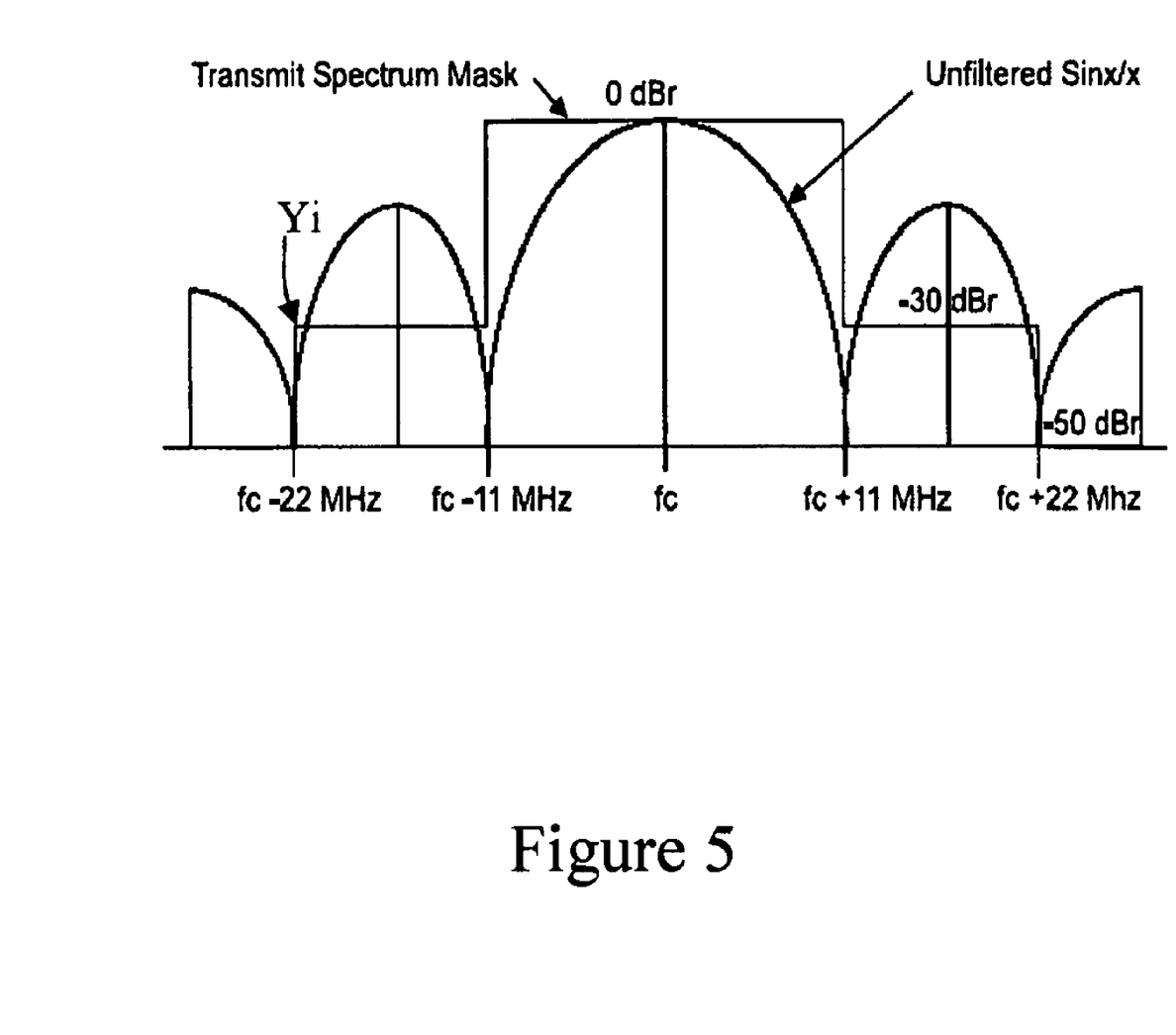
FIG. 5 illustrates the 802.11b Transmit Spectrum Mask.

For example, in FIG. 4A, at 20 MHz from the center frequency on each side of the 802.11a transmit spectrum mask, the adjacent channel rejection power level is −28 dB. Since the channel separation for 802.11a is 20 MHz, we can expect the adjacent channel rejection power level to be at least 28 dB. However, because signals are transmitted in OFDM, an additional 18 dB is suppressed, resulting in a 46 dB adjacent channel rejection power level for 802.11a APs that are one channel away. FIG. 5 illustrates ACI caused by side lobes in the 802.11b transmit spectrum mask.

Note every mode of operation uses channels having different spacing, and thus the number of adjacent channels that are used in calculating the ACI at step 120 (FIG. 2) is determined by a mode of operation of the AP. For example, for APs operating in 802.11a mode, calculations are performed as though each AP had to consider the effects only of one neighboring channel on each side. For other modes of operation, for example for those platforms that support Turbo channels, multiple side channels are incorporated into the ACI measurement calculation. Note that the present invention is not limited to the inclusion of any specific number of side channels in the ACI measurement. Thus, the ACI measurement can be determined through the use of Equation II below:

$$P_{ACI}=10 \log \Sigma[10^{\wedge}(y_i/10)]; \quad \text{Equation II:}$$

where $P_{ACI}$ is the predicted adjacent channel interference and the $y_i$ is the adjacent channel rejection noise level illustrated in FIGS. 4A and 5.

The adjacent channel interference raises the average channel receive noise level and in turn linearly reduces the RSSI value of the received signal. To represent this effect, the predicted ACI is added to the co-channel congestion for each channel. For example if the adjacent channel interference increased the average receive noise level by 3 dBs, 3 dBs is to the AP power measured on the channel to determine channel quality. When comparing two channels with APs having the same signal strength, but one channel has adjacent channel interference and other doesn't, the channel that has no interference is favored.

Using the above theory, the ACI for each 802.11a channel can be generally calculated using the equations in below Table III (for 20 mHz spaced channels):

TABLE III

| Number of Channels Away | Predicted Adjacent Channel Spill-Over $y_i$ |
|---|---|
| 1 | $X_1$ + (−46 dB) |
| 2 | $X_2$ + (−58 dB) |
| 3 | $X_3$ + (−62 dB) |
| 4 | $X_4$ + (−66 dB) |

Amount of Spill-Over from 802.11a Adjacent Operating Channels
(Notes:
$x_i$ = signal strength of the adjacent channel AP in dBm measured on the channel they are on; If yi is smaller than the platform noise floor, we can ignore it)

and the ACI for each 802.11b channel can be generally calculated using the equations in below Table IV (for 5 mHz spaced channels):

TABLE IV

| Number of Channels Away | Predicted Adjacent Channel Spill-Over $y_i$ |
|---|---|
| 1 | $X_1$ + (−0 dB) |
| 2 | $X_2$ + (−6 dB) |
| 3 | $X_3$ + (−32 dB) |
| 4 | $X_4$ + (−46 dB) |

Amount of Spill-Over from 802.11b/g Adjacent Operating Channels
(Notes:
$x_i$ = signal strength of the adjacent channel AP in dBm measured on the channel they are on; If yi is smaller than the platform noise floor, we can ignore it)

As shown at step 160 of FIG. 2, in one embodiment, a user selected weight value $w_2$ may be electively applied to the adjacent channel interference predication value to increase or decrease the impact of adjacent channel noise when determining the overall channel quality index (CQI).

3). In Band Noise

The in-band noise power ratio is the ratio of (a) the mean noise power measured in any channel, with all channels loaded with white noise, to (b) the mean noise power measured in the same channel, with all channels but the measured channel loaded with white noise. According to the present invention, the in-band noise power level correlates to the receive power level of the hardware, and the value is measured for each usable channel by an AP at step 140 of FIG. 2. The in-band noise of each channel can be measured after the channel is scanned for APs. In one embodiment, the receive power level of the hardware is monitored once per scan cycle to average out slow pulsing noise, although this is not a requirement. Any deviation of the receive power level from the platform noise floor is an indication of the amount of in-band noise, or external noise added to the channel. For example if the measured receive power level for the 11 g radio is −90 dBm, then the added noise is 4 dB.

According to one embodiment of the invention, if the receive power level for a channel is determined to cross a pre-determined upper bound power level, the channel as identified as unusable and removed from further power-up channel selection consideration. Upper bounds may be dictated by the hardware of the AP.

To compensate for possible small variations of measured receive power levels for the APs, in one embodiment, in-band noise is quantized in order to provide incremental steps for in-band noise indication. The platform noise floor of the system is compared against the in-band added noise floor. The amount by which the added noise floor exceeds the platform noise floor is used to determine the weighted noise addition, as shown in Table V below. An equation that may be used in calculating in-band noise for 802.11a operating mode is provided in below Equation III, where y is the platform noise floor:

Total In-Band Interference Power: $P_{IB}=y-(-91 \text{ dBm})$;
if $y<-91 \text{ dBm}, y=-91 \text{ dBm}$     Equation III:

An equation that may be used in calculating in-band noise for 802.11b/g operating mode is provided in below Equation IV, wherein y is the platform noise floor:

Total In-Band Interference Power: $P_{IB}=y-(-94 \text{ dBm})$;
if $y<-94 \text{ dBm}, y=-94 \text{ dBm}$     Equation IV:

As it known, the presence of noise can reduce the capacity of an information channel. The relationship between the quantity of noise and the reduction of the capacity of the channel is non-linear. According to one aspect of the invention, to account for the reducing capacity, a noise degradation factor is applied to the measured added noise value. Table V illustrates the non-linear relationship between increasing noise and signal degradation, showing that the degradation factors are not linear as the in-band noise value increasing. Table V is indexed by the $P_{IB}$ obtained above in Equation III or Equation IV. the in-band noise increases, the CQI is dominated by the noise over the co-channel congestion. It should that the weights applied to the in-band noise value are merely exemplary; other methods of assigning weight values to the in-band noise measurements may alternatively be used without impacting the scope of the present invention.

TABLE V

| Measured in-band added noise above the platform noise floor | Weighted in-band noise addition |
| --- | --- |
| 1 | 2.1 |
| 2 | 3.1 |
| 3 | 4.3 |
| 4 | 5.3 |
| 5 | 6.6 |
| 6 | 7.6 |
| 7 | 9 |
| 8 | 10 |
| 9 | 11.7 |
| 10 | 12.7 |
| 11 | 14.2 |
| 12 | 15.2 |
| 13 | 17 |
| 14 | 18 |
| 15 | 19.6 |
| 16 | 21.3 |
| 17 | 22.3 |
| 18 | 24.4 |
| 19 | 25.4 |
| 20 | 28 |
| 21 | 30.1 |
| 22 | 31.8 |
| 23 | 34.9 |
| 24 | 40 |
| 25 | 45 |
| 26 | 51 |
| 27 | 59 |
| 28 | 73.7 |
| 29 | 82.3 |

The weight is dB for dB above 29

In addition, as shown at step 160 of FIG. 2, in one embodiment, a user selected weight value $w_3$ may be selectively applied to the in-band interference predication value to increase or decrease the impact of in-band interference when determining the overall channel quality index (CQI).

Channel Quality Index Calculation

According to one embodiment, the Channel Quality Index (CQI) is the sum of all three interference measurements or predictions for each channel. The channel with the lowest CQI is the channel having the lowest interference, and thereby is determined to be the channel which is the preferred channel for transmissions.

Table VI below illustrates exemplary values that may be measured for each one of eleven bands. Given the 5 mHz spacing of the channels, the AP may use either channel 1, channel 6 or channel 11. In the below example, channel 1 will be picked even though channel 6 is empty, because the adjacent channel interference of channel 5 reduces the quality of the channel.

TABLE VI

| Channel | Power in dBm | Adjacent Channel Interference Power | Channel Power including adjacent channels | In-Band Noise | CQI |
| --- | --- | --- | --- | --- | --- |
| 1 | −36 | −74.93 | −36.00 | 4 | −32.00 |
| 2 | −94(empty) | | | | |
| 3 | −94(empty) | | | | |
| 4 | −94(empty) | | | | |
| 5 | −29 | | | | |
| 6 | −94(empty) | −28.99 | −28.99 | 0 | −28.99 |
| 7 | −94(empty) | | | | |
| 8 | −48 | | | | |
| 9 | −94(empty) | | | | |
| 10 | −94(empty) | | | | |
| 11 | −29 | −79.79 | −29.00 | 2 | −27.00 |

Figure 6:
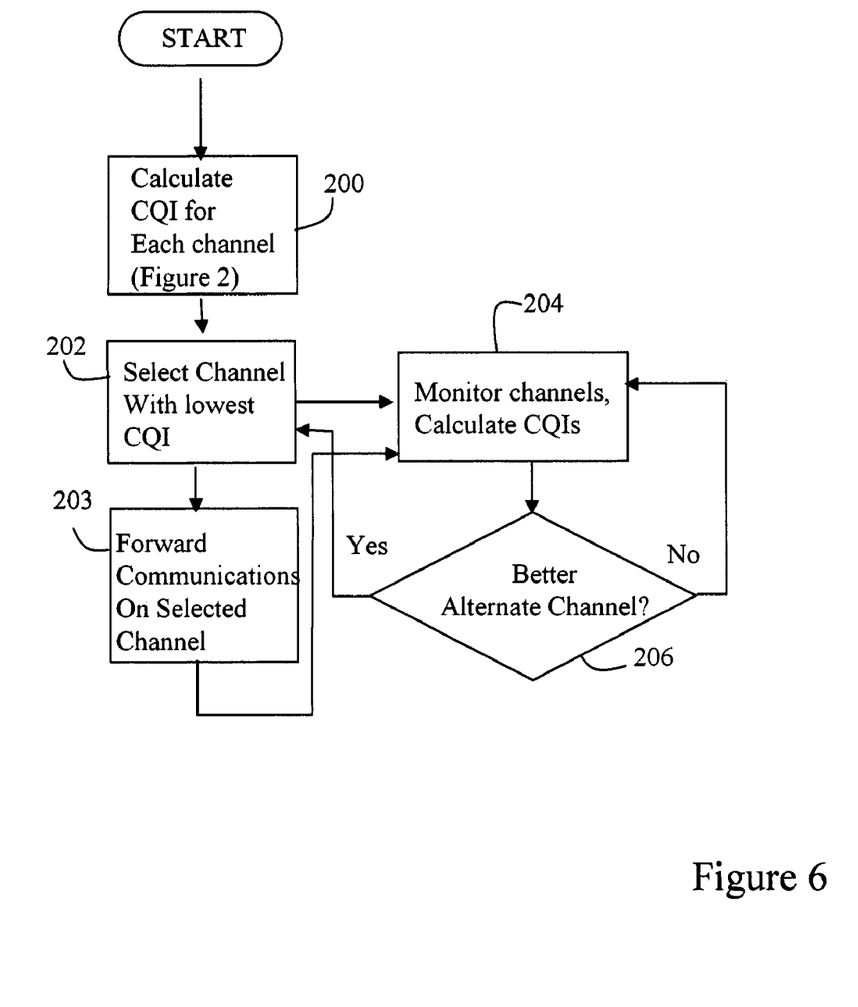
FIG. 6 is a flow diagram provided to show the use of the Channel Quality Indices by an Access Point during a channel selection process.

Referring briefly to FIG. 6, a flow diagram illustrating how the CQI of the present invention may be used for channel selection is shown. At step 200, an AP scans each available transmission channel to identify different interferences and generates a CQI for that channel as discussed in the two embodiments described in FIGS. 2 and 3. At step 202, the AP selects a highest quality channel; that channel being the one with the lowest interference value. Once the channel is selected, at step 203 the AP begins issuing communications on the channel. Concurrently, the AP continues to evaluate interference on the alternate channels, updating the CQI values for each channel as the network characteristics change. At some point the AP may decide to change channels. The AP may decide to change channels for any variety of reasons, including because interference on the current channel has degraded communications. The AP may decide to switch channels when a better alternate channel is discovered, although it is recognized that switching between channels will temporarily degrade wireless network performance. Suffice it to say that when the AP decides to change channels, the CQI values of the channels found in step 204 are compared at step 202 again to select the one with lowest CQI, and thus the lowest amount of interference.

Accordingly a system, method and apparatus for identifying and quantifying a channel quality index to permit an access point to more quickly identify a preferable channel for communication has been shown and described. Having described an exemplary embodiment of the present invention, it will be appreciated that various modifications may be made without diverging from the spirit and scope of the invention. The above description has talked of the present invention in terms of functional blocks delineated in a manner to facilitate description. However, it should be noted that the invention may be implemented in a variety of arrangements, using hardware, software or a combination thereof, and the present invention is not limited to the disclosed embodiment. For example, FIG. 6 is a flowchart illustration of methods, apparatus (systems) and computer program products according to an embodiment of the invention. It will be understood that each block of the flowchart illustrations, and combinations of blocks in the flowchart illustrations, can be implemented by computer program instructions. These computer program instructions may be loaded onto a computer or other programmable data processing apparatus to produce a machine, such that the instructions which execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

Those skilled in the art should readily appreciate that programs defining the functions represented by functional blocks of FIGS. 1-6 of the present invention can be delivered to a computer in many forms; including, but not limited to: (a) information permanently stored on non-writable storage media (e.g. read only memory devices within a computer such as ROM or CD-ROM disks readable by a computer I/O attachment); (b) information alterably stored on writable storage media (e.g. floppy disks and hard drives); or (c) information conveyed to a computer through communication media for example using baseband signaling or broadband signaling techniques, including carrier wave signaling techniques, such as over computer or telephone networks via a modem.

While the invention is described through the above exemplary embodiments, it will be understood by those of ordinary skill in the art that modification to and variation of the illustrated embodiments may be made without departing from the inventive concepts herein disclosed. Accordingly, the invention should not be viewed as limited except by the scope and spirit of the appended claims.

The invention claimed is:

1. A channel selection method including the steps of:
   calculating a channel quality index (CQI) for a each one of a plurality of channels available for communication use by an access point in a wireless network; and
   the access point selecting a preferred channel for operation according to relative channel quality indices of the plurality of channels,
   wherein the channel quality index quantifies channel quality as a function of co-channel congestion, adjacent channel interference and in-band interference.

2. The channel selection method of claim 1, further including the step of continually monitoring the plurality of channels and updating the channel quality indices.

3. The method of claim 2 including the step of selecting an alternate channel for operation responsive to the alternate channel having a more desirable CQI relative to a CQI of the preferred channel.

4. The channel selection method of claim 1, wherein the co-channel congestion selected the larger of: a platform noise floor of the channel or a measured received power level of a loudest transceiver on the channel.

5. The channel selection method of claim 1, wherein the adjacent channel interference is a predicted adjacent channel interference (PAcI) defined by the below formula: $P_{ACI} = 10 \log \Sigma [10^{(y_i/10)}]$; wherein $y_i$ is an adjacent channel noise level associated with a mode of operation of the access point.

6. The channel selection method of claim 1, wherein the in-band interference is a quantized received noise level of the access point.

7. The channel selection method of claim 6, wherein the in-band interference is weighted to reflect a non-linear information loss associated with an increase in in-band interference.

8. The channel selection method of claim 1, further including the step of applying different weights to the at least two different types of noise.

9. An access point device including:
   a memory, storing, for each one of a plurality of channels available for communication by the access point, a channel quality index, the channel quality index quantifying channel quality as a function of co-channel congestion, adjacent channel interference and in-band interference.

10. The access point device of claim 9, further comprising:
    Select logic, coupled to the memory, for selecting a preferred channel from the plurality of channels for use by the access point responsive to the associated channel quality index of the preferred channel.

11. The access point device of claim 10 further comprising background scanning logic, operable to periodically scan the plurality of channels and update the corresponding plurality of channel quality indices, and wherein the select logic further includes means for selecting an alternate channel having a more desirable channel quality index than the preferred channel.

12. A computer program product stored in a computer readable device, the computer program logic including:
program code for calculating a channel quality index for each of a plurality of channels available for communication by an access point, the program code including program code for measuring a co-channel congestion, predicting an adjacent channel interference and quantizing a weighted in-band interference for each of the plurality of channels, and for summing the co-channel congestion, predicted adjacent channel interference and quantized weighted in-band interference to provide a channel quality index; and program code for selecting one of the plurality of channels as a preferred channel for transmission responsive to the channel quality indices of the plurality of channels.

* * * * *